United States Patent
Kalyanasundharam et al.

(10) Patent No.: US 12,189,535 B2
(45) Date of Patent: Jan. 7, 2025

(54) TIERED MEMORY CACHING

(71) Applicant: Advanced Micro Devices, Inc., Santa Clara, CA (US)

(72) Inventors: Vydhyanathan Kalyanasundharam, Santa Clara, CA (US); Ganesh Balakrishnan, Austin, TX (US); Kevin M. Lepak, Austin, TX (US); Amit P. Apte, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 98 days.

(21) Appl. No.: 18/091,140

(22) Filed: Dec. 29, 2022

(65) Prior Publication Data

US 2024/0220415 A1    Jul. 4, 2024

(51) Int. Cl.
*G06F 12/08* (2016.01)
*G06F 12/0897* (2016.01)

(52) U.S. Cl.
CPC .. *G06F 12/0897* (2013.01); *G06F 2212/1016* (2013.01)

(58) Field of Classification Search
CPC . G06F 12/0844–0897; G06F 2212/1016–1024
See application file for complete search history.

(56) References Cited

U.S. PATENT DOCUMENTS

| | | | |
|---|---|---|---|
| 10,157,137 B1 * | 12/2018 | Jain | G06F 12/0864 |
| 11,327,890 B1 | 5/2022 | Mukherjee | |
| 2004/0123035 A1 * | 6/2004 | Gilbert | G06F 11/1064 711/144 |
| 2018/0004669 A1 * | 1/2018 | Usui | G06F 12/0897 |
| 2018/0018264 A1 | 1/2018 | Moyer | |
| 2019/0179760 A1 * | 6/2019 | Bhargava | G06F 12/0893 |
| 2021/0318958 A1 | 10/2021 | Pawlowski et al. | |
| 2022/0113915 A1 | 4/2022 | Ki et al. | |
| 2022/0405209 A1 * | 12/2022 | ChoFleming | G06F 12/0238 |

FOREIGN PATENT DOCUMENTS

KR    2018-0109189 A    10/2018

OTHER PUBLICATIONS

International Search Report and Written Opinion for International Application No. PCT/US2023/086039, mailed May 14, 2024 (8 pages).

* cited by examiner

*Primary Examiner* — Khoa D Doan

(74) *Attorney, Agent, or Firm* — Greenberg Traurig, LLP

(57) ABSTRACT

The disclosed computer-implemented method includes locating, from a processor storage, a partial tag corresponding to a memory request for a line stored in a memory having a tiered memory cache and in response to a partial tag hit for the memory request, locating, from a partition of the tiered memory cache indicated by the partial tag, a full tag for the line. The method also includes fetching, in response to a full tag hit, the requested line from the partition of the tiered memory cache. Various other methods, systems, and computer-readable media are also disclosed.

20 Claims, 8 Drawing Sheets

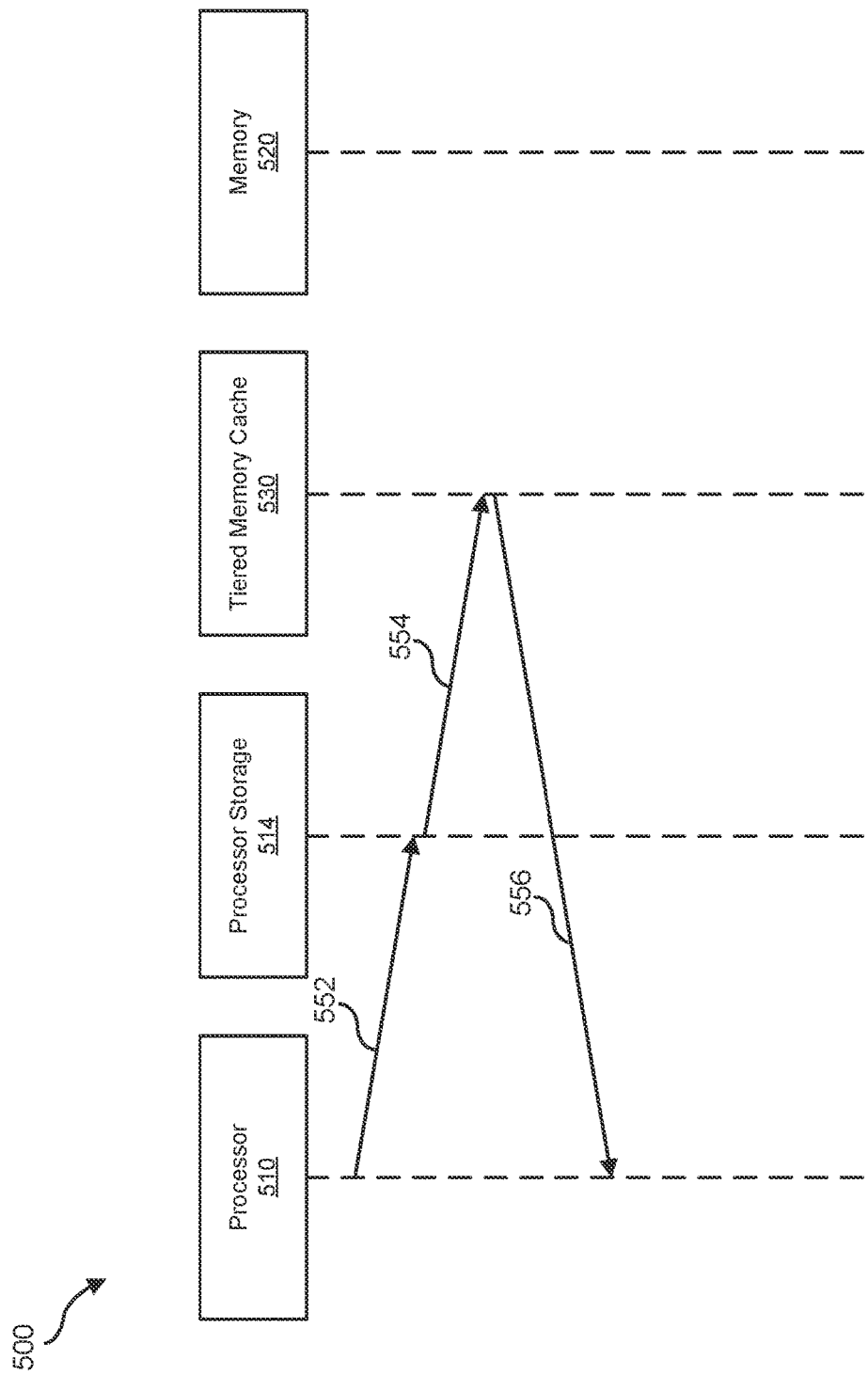

TIERED MEMORY CACHING

BACKGROUND

Processors read and write data and/or instructions from a memory. Increasing memory sizes and processing speeds have created bottlenecks when accessing memory. A cache is a faster but smaller memory for storing data that is repeatedly accessed in order to reduce memory accesses. A processor often uses multiple caches in a cache hierarchy. In addition, efforts to increase memory sizes include using cheaper and slower memory. Effective utilization of caches can mitigate some of these adverse effects.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 5A-5B are flow diagrams of a partial tag hits for a tiered memory cache.

Figure 1:
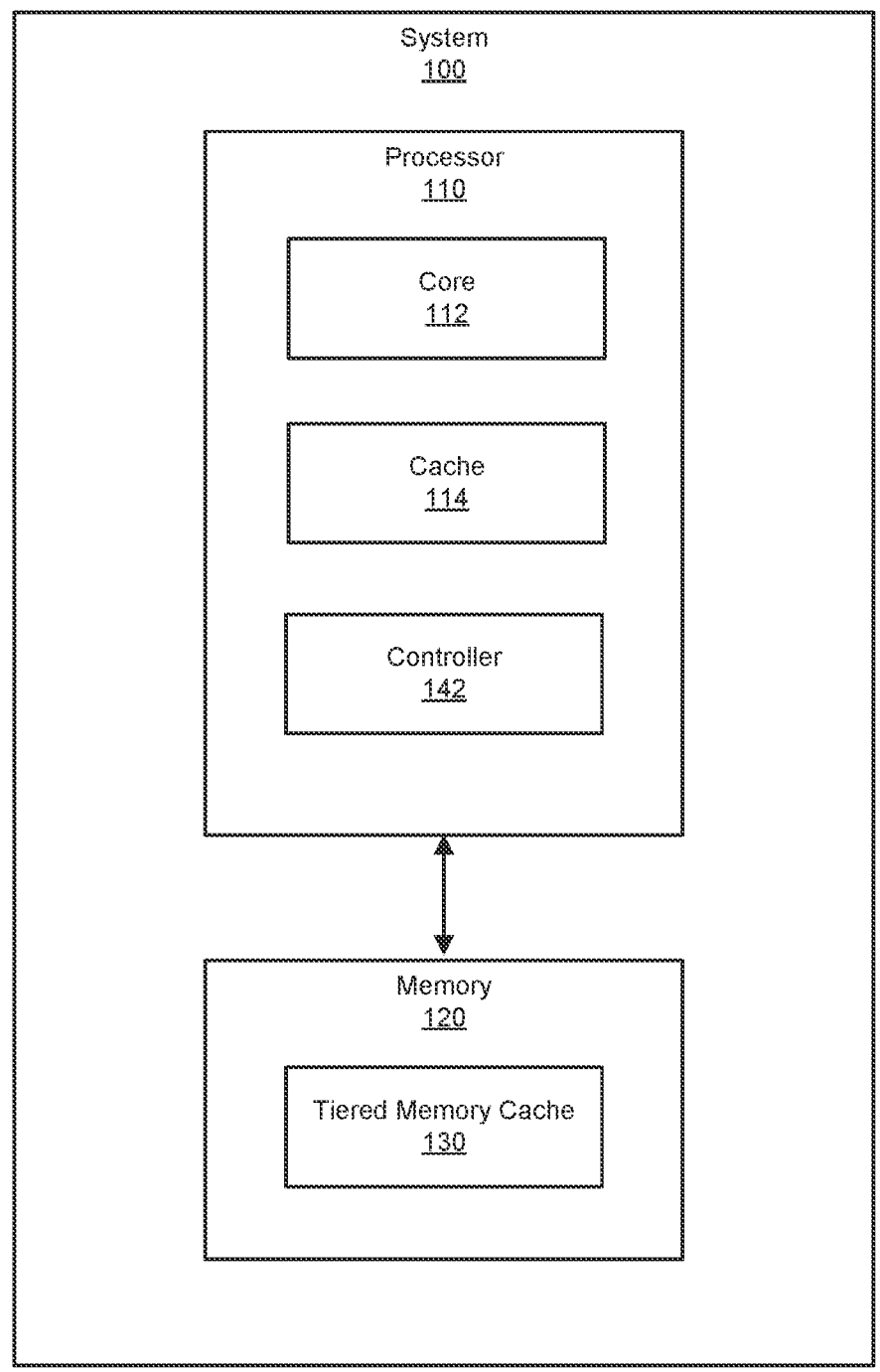
FIG. 1 is a block diagram of an exemplary system for a tiered memory cache.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to tiered memory caching. As will be explained in greater detail below, implementations of the present disclosure provide for a tiered memory cache that utilizes a partial tag for an initial lookup, followed by a full tag lookup. The systems and methods described herein can improve the functioning of a computer itself by more efficient utilization of a tiered memory cache that reduces overhead for looking up entries. For example, implementations of the present disclosure can reduce a number of accessing memory for tag lookups.

As will be described in greater detail below, the instant disclosure describes various systems and methods for implementing a tiered memory cache. A partial tag stored in a processor storage or cache is initially used for a tag lookup. In response to a partial tag hit, a corresponding full tag can be looked up and in response to a full tag hit, the requested line can be retrieved from the tiered memory cache.

In one example, a device for implementing a tiered memory cache includes a physical memory, a tiered memory cache associated with the physical memory, and a controller configured to locate, from a processor storage, a partial tag corresponding to a memory request for a line stored in the memory, in response to a partial tag hit for the memory request, locate, from a partition of the tiered memory cache indicated by the partial tag, a full tag for the line, and process, based on locating the full tag, the requested line from the partition of the tiered memory cache according to the memory request.

In some examples, the controller is further configured to, in response to a full tag miss, fetching the requested line from the memory. In some examples, the controller is further configured to, in response to a partial tag miss, fetch the requested line from the memory. In some examples, the controller is further configured to evict a page from the tiered memory cache, and replace, in the processor storage, a partial tag corresponding to the evicted page with a partial tag corresponding to the missed partial tag. In some examples, the controller is further configured to write the evicted page to the memory when the evicted page is dirty.

In some examples, the full tag is stored using one or more error correction code (ECC) bits in the tiered memory cache. In some examples, the partial tag corresponds to a page. In some examples, the partial tag comprises a subset of the corresponding full tag. In some examples, the tiered memory cache comprises a set associative cache for the memory.

In one implementation, a system for a tiered memory cache includes a physical memory, a tiered memory cache faster than the physical memory, at least one physical processor comprising a processor storage, and a controller. The controller is configured to locate, from the processor storage, a partial tag corresponding to a memory request for a line stored in the physical memory, in response to a partial tag hit for the memory request, locate, from a partition of the tiered memory cache indicated by the partial tag, a full tag for the line, in response to a full tag miss, fetch the requested line from the physical memory, and process the requested line according to the memory request.

In some examples, the controller is further configured to in response to a partial tag miss, fetch the requested line from the physical memory, evict a page from the tiered memory cache, and replace, in the processor storage, a partial tag corresponding to the evicted page with a partial tag corresponding to the missed partial tag. In some examples, the controller is further configured to write the evicted page to the memory when the evicted page is dirty.

In some examples, the full tag is stored using one or more error correction code (ECC) bits in the tiered memory cache. In some examples, the partial tag corresponds to a page and the partial tag comprises a subset of the corresponding full tag. In some examples, the tiered memory cache comprises a set associative cache for the physical memory.

In one implementation, a method for a tiered memory cache includes locating, from a processor storage of at least one physical processor, a partial tag corresponding to a memory request for a line stored in a physical memory, in response to a partial tag miss, fetching the requested line from the physical memory, evicting a page from a tiered memory cache comprising a set associative cache for the physical memory, and replacing, in the processor storage, a partial tag corresponding to the evicted page with a partial tag corresponding to the missed partial tag.

In some examples, the method further includes writing the evicted page to the memory when the evicted page is dirty. In some examples, the method further includes in response to a partial tag hit for the memory request, locating, from a partition of the tiered memory cache indicated by the partial tag, a full tag for the line, in response to a full tag miss, fetch the requested line from the physical memory, and processing, based on locating the full tag in the partition of the tiered memory cache, the requested line from the partition of the tiered memory cache according to the memory request.

In some examples, the full tag is stored using one or more error correction code (ECC) bits in the tiered memory cache. In some examples, the partial tag corresponds to a page and the partial tag comprises a subset of the corresponding full tag.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-7, detailed descriptions of a tiered memory cache. Detailed descriptions of example systems for a tiered memory cache will be provided in connection with FIGS. 1-3. Detailed descriptions of an example partial tag miss will be provided in connection with FIG. 4. Detailed descriptions of example partial tag hits will be provided in connection with FIGS. 5A-5B. Detailed descriptions of an example updating a dirty page will be provided in connection with FIG. 6. Detailed descriptions of corresponding computer-implemented methods will also be provided in connection with FIG. 7.

FIG. 1 is a block diagram of an example system 100 for a tiered memory cache. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a core 112, a cache 114, and a controller 142. Processor 110 is coupled to a tiered memory cache 130 of memory 120. Core 112 corresponds to a processor core, although in other examples corresponds to a chiplet such as a chiplet of an accelerator. Cache 114 corresponds to a cache used by processor 110 (e.g., a client-side cache such as a low-level cache or L1 cache). In some examples, cache 114 corresponds to and/or includes other caches, such as a memory-side cache. Tiered memory cache 130 corresponds to a last level cache for memory 120 as will be discussed further herein. Controller 142 corresponds to a control circuit that can coordinate with tiered memory cache 130, such as by fetching tags to coordinate memory requests to tiered memory cache 130. In some examples, controller 142 also controls aspects of cache 114.

Processor 110 reads and operates on instructions and/or data stored in memory 120. Because memory 120 is often slower than processor 110, memory access times create bottlenecks for processor 110. To alleviate this problem, processor 110 includes cache 114, which is typically a fast memory with access times less than that of memory 120, in part due to being physically located in processor 110.

Cache 114 holds data and/or instructions read from memory 120. Processor 110 (and/or core 112) first makes memory requests to cache 114. If cache 114 holds the requested data (e.g., a cache hit), processor 110 reads the data from cache 114 and avoids the memory access times of memory 120. If cache 114 does not hold the requested data (e.g., a cache miss), processor 110 retrieves the data from memory 120, incurring the memory access time. Although a larger cache size can reduce cache misses, considerations such as die size and power consumption limits the size of cache 114. Thus, to further reduce the need to access memory 120 on cache misses, processor 110 incorporates another cache (e.g., tiered memory cache 130 and in some examples intervening levels of caches), that is larger but slower than cache 114, in a cache hierarchy.

As will be described further below, tiered memory cache 130 is a last level cache corresponding to memory 120. As tiered memory cache 130 is smaller than memory 120, tiered memory cache 130 is mapped to a portion of memory 120, as will be further described below. Because tiered memory cache 130 is a last level cache, a memory request exhibits cache misses on lower-level caches before reaching tiered memory cache 130.

Figure 2:
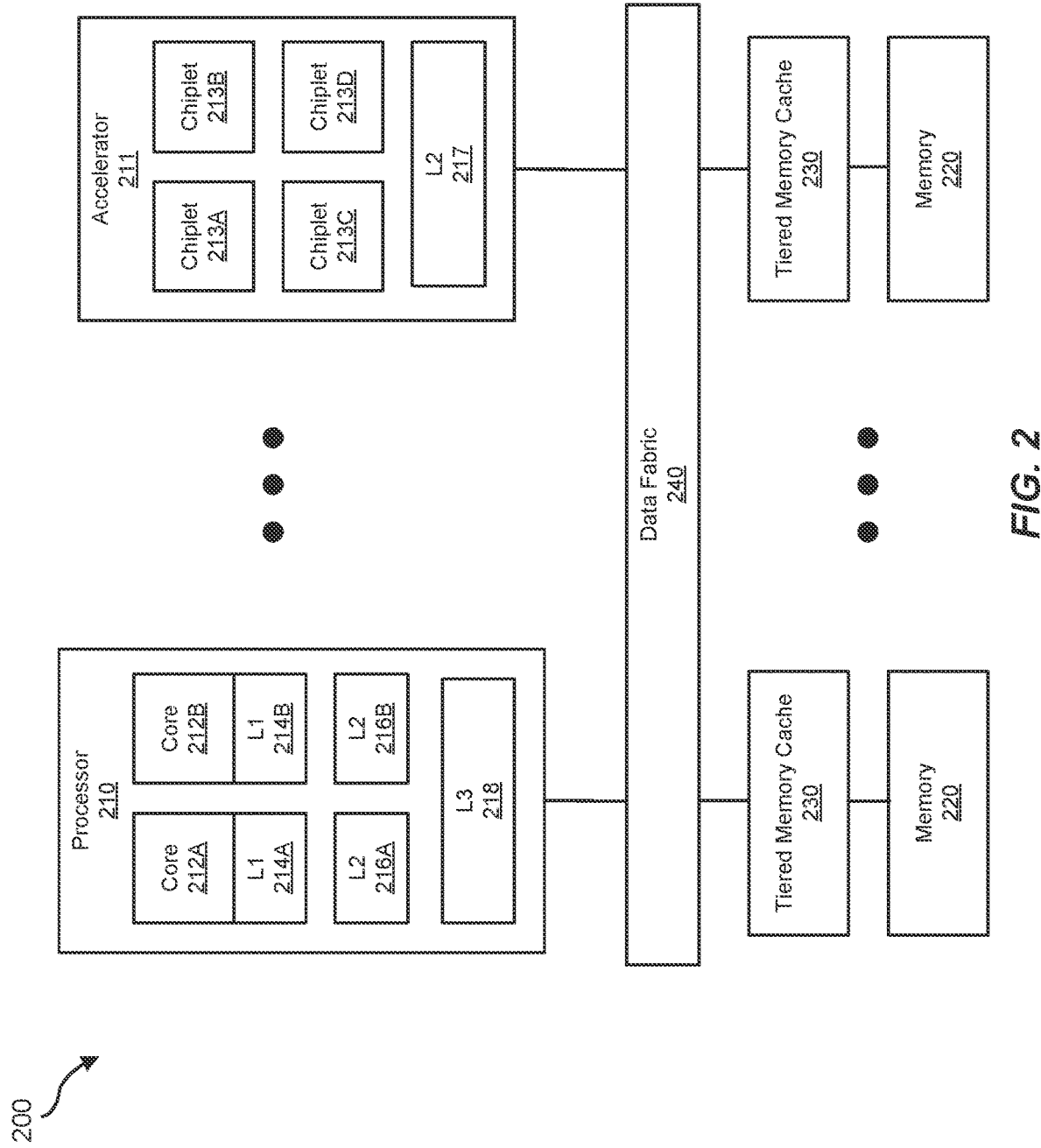
FIG. 2 is a simplified block diagram of an exemplary cache hierarchy.

FIG. 2 illustrates an example cache hierarchy in a system 200 which corresponds to system 100. System 200 includes one or more processors 210 which corresponds to processor 110 and one or more accelerators 211 which corresponds to processor 110. As illustrated in FIG. 2, processor 210 includes a core 212A which corresponds to core 112, a core 212B which corresponds to core 112, an L1 cache 214A which corresponds to cache 114, an L1 cache 214B which corresponds to cache 114, an L2 cache 216A which can correspond to cache 114, an L2 cache 216B which can correspond to cache 114, and an L3 cache 218 which can correspond to cache 114.

In the cache hierarchy of FIG. 2, level 1 (L1) corresponds to a lowest level of the hierarchy. L1 caches, such as L1 cache 214A and L1 cache 214B, can be implemented with a fast memory, such as static random-access memory (SRAM). To further prioritize speed, L1 caches can also be integrated with processor 210, for example within core 212A and core 212B respectively, which can improve latency and throughput. In some examples, as shown in FIG. 2, processor 210 includes multiple L1 caches.

L2 caches, such as L2 cache 216A and L2 cache 216B, are the next level in the cache hierarchy after L1 caches, which can be larger than and slower than L1 caches. Although integrated with processor 210, L2 caches can, in some examples, be located outside of a chip core, but can also be located on the same chip core package. L3 caches such as L3 cache 218 can be larger than L2 caches but can also be slower. In some examples, L3 caches can serve as a bridge to the main memory (e.g., memory 220). As such, L3 caches can be faster than the main memory. In some examples, multiple processors and/or cores can share an L3 cache, which can be located on the same chip core package or outside the package.

Memory 220 which corresponds to memory 120, stores instructions and/or data for processor 210 to read and use. Memory 220 can be implemented with dynamic random-access memory (DRAM). As shown in FIG. 2, the cache hierarchy further includes a tiered memory cache 230 (e.g., a memory-side cache) which corresponds to tiered memory cache 130, and a data fabric 240 which corresponds to various structures, connections, and control circuits for sending data between memory and cache structures.

System 200 also includes one or more accelerators having a similar cache hierarchy. Accelerator 211 includes a chiplet 213A which corresponds to core 112, a chiplet 213B which corresponds to core 112, a chiplet 213C which corresponds to core 112, a chiplet 213D which corresponds to core 112, and an L2 cache 217 which corresponds to cache 114 that is shared by the chiplets.

In some examples, tiered memory cache 230 is a last level cache akin to a level 4 (L4) cache for processor 210 and/or an L3 cache for accelerator 211. As such, tiered memory cache 230 is closest to memory 220, and in some examples is partitioned from a same or nearby memory structure, as will be explained further in connection with FIG. 3.

Figure 3:
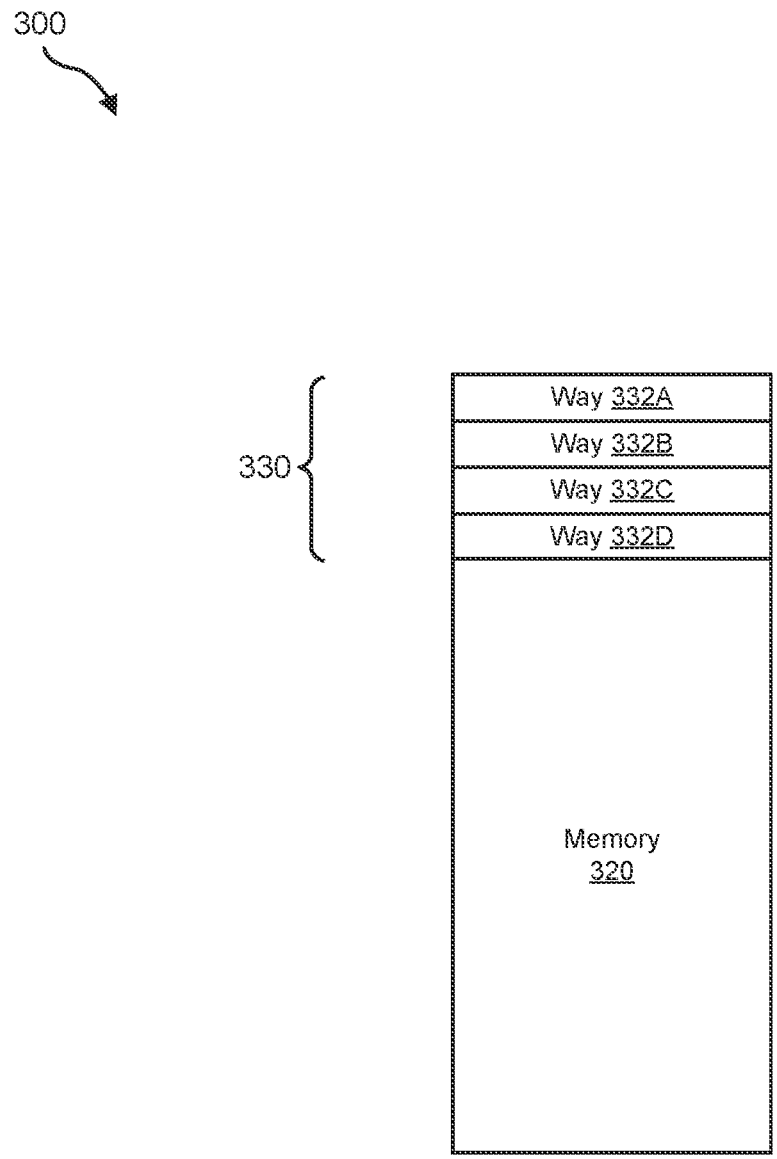
FIG. 3 is a simplified block diagram of a tiered memory cache.

FIG. 3 illustrates a memory device 300 which corresponds to memory 120 and/or memory 220. Memory device 300 represents a memory structure having a size (e.g., 32 GB) that is partitioned into a memory 320 (e.g., a main memory as usable by an operating system, corresponding to memory 120 and/or memory 220) and a tiered memory cache 330 corresponding to tiered memory cache 130 and/or tiered memory cache 230. Tiered memory cache 330 is an associative set of memory 320. More specifically, in the exampled illustrated in FIG. 3, tiered memory cache 330 is a 4-way associative set having four ways, namely a way 332A, a way 332B, a way 332C, and a way 332D.

A size of each of way 332A, way 332B, way 332C, and way 332D can be selected based on the size of memory 320. For example, for memory 320 being 30 GB (out of a total 32 GB), each way can be 512 MB such that tiered memory cache 330 is 2 GB. In other examples, memory 320 can have a different size and/or comprise a different percent of memory device 300, tiered memory cache 330 can have fewer or more ways, and each way can have different and/or non-similar sizes. Other mapping schemes can be used instead of an associative set. For example, direct mapping can be used, although direct mapping is not as scalable as an associative set. Because direct mapping correlates addresses in the tiered memory cache to the main memory on a 1-to-1 basis, only a small portion of the main memory can be represented by the tiered memory cache. Using an associative set, memory addresses can be hashed such that more of the main memory can be represented. Thus, in some examples, using the associative set also requires an updated addressing scheme, as described further herein.

Returning to FIG. 2, when processor 210 makes a memory request, the lowest level cache is first checked, proceeding to higher level caches upon cache misses until accessing memory 220 when needed. For example, core 212A processes a memory request by first checking L1 cache 214A. Upon an L1 cache miss (e.g., L1 cache 214A does not have the requested data), L2 cache 216A is checked, upon an L2 cache miss (e.g., L2 cache 216A does not have the requested data), L3 cache 218 is checked. Upon an L3 cache miss (e.g., L3 cache 218 does not have the requested data), tiered memory cache 230 is checked.

As illustrated in FIG. 2, tiered memory cache 230 is off chip (e.g., separate from processor 210 and/or accelerator 211) and is accessed across data fabric 240. Checking tiered memory cache 230 includes looking up a full tag corresponding to an address of the requested line or other data segment. However, looking up the full tag incurs overhead for accessing tiered memory cache 230 across data fabric 240. In some examples, the overhead for such look ups can reduce performance benefits of using tiered memory cache 230.

To reduce overhead of full tag lookups in tiered memory cache 230, the implementations described herein store tags on die. In some examples, local processor storage (e.g., cache 114, L1 caches 214A-B, L2 caches 216A-B, L2 cache 217, L3 cache 218, other on-die caches and/or other processor storage) can store tags for tiered memory cache 230. More specifically, in some examples, partial tags (rather than full tags) can be stored on die in order to reduces metadata storage requirements. For instance, a partial tag corresponds to a page or other data segment larger than a line or what is requested in a memory request, which in some examples requires less bits to represent. If the corresponding page is not found in the partial tags, it is guaranteed that the requested line will not be in tiered memory cache 230. Thus, a partial tag miss can avoid an expensive lookup in tiered memory cache 230 that will result in a miss.

Figure 4:
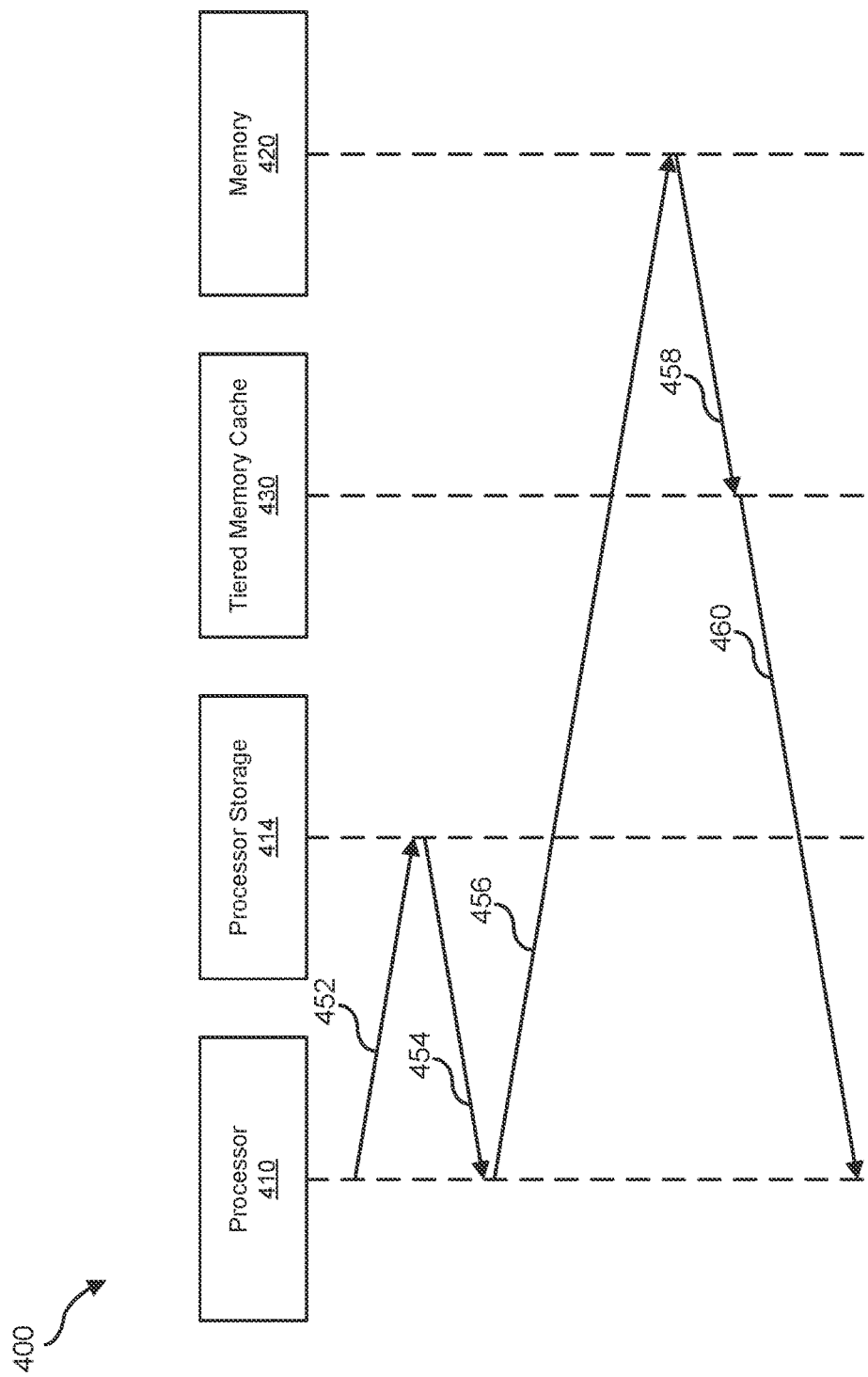
FIG. 4 is a flow diagram of a partial tag miss for a tiered memory cache.

FIG. 4 illustrates an example flow 400 for a partial tag miss. FIG. 4 illustrates a processor 410 (corresponding to processor 110, processor 210, and/or accelerator 211), a processor storage 414 (corresponding to cache 114, L1 caches 214A-B, L2 caches 216A-B, L2 cache 217, L3 cache 218, and/or other on-die storage), a tiered memory cache 430 (corresponding to tiered memory cache 130, tiered memory cache 230, and/or tiered memory cache 330), and a memory 420 (corresponding to memory 120, memory 220, and/or memory 320).

When processor 410 and/or a core/chiplet thereof processes a memory request for tiered memory cache 430 (e.g., after exhibiting cache misses for lower-level caches), processor 410 and/or a controller thereof first locates a partial tag corresponding to the memory request at 452. In some examples, partial tags use an addressing scheme relating a page to lines contained therein. Thus, processor 410 requests the partial tag for the page relating to the line requested in the original memory request.

When the requested page's partial tag is unavailable in processor storage 414, a partial tag miss is exhibited at 454. The partial tag miss indicates that the requested page and therefore requested line is not available in tiered memory cache 430, corresponding to a cache hit. A full tag lookup is not needed such that the memory request proceeds to memory 420 at 456. Memory 420 returns the requested line at 460, which can also be written to tiered memory cache 430 at 458 to update tiered memory cache 430 (which can include a page eviction) in response to the cache miss. Alternatively, for a write request, the write is performed on the requested line in memory 420 at 456, which can be propagated to tiered memory cache 430 at 458 (e.g., by updating tiered memory cache 430) and acknowledged at 460. In addition, the corresponding partial and full tags can be written to appropriate storages.

As illustrated in FIG. 4, a partial tag miss avoids accessing tiered memory cache 430. However, in some examples, a partial tag hit does not guarantee a cache hit, requiring a full tag lookup.

Figure 5B:
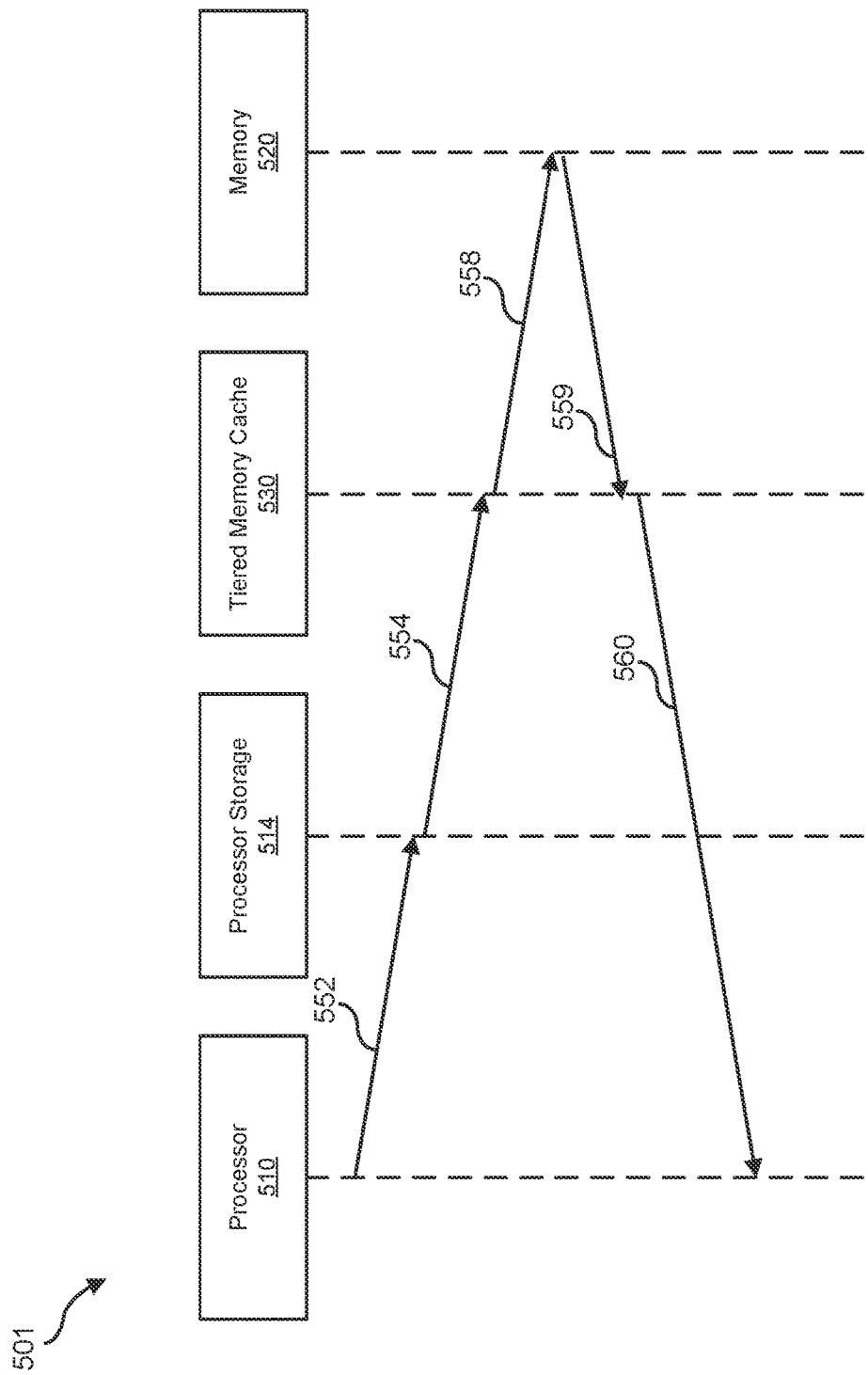

FIGS. 5A and 5B illustrates an example flow 500 and an example flow 501, respectively, for a partial tag hits. FIGS. 5A-5B illustrate a processor 510 (corresponding to processor 110, processor 210, and/or accelerator 211), a processor storage 514 (corresponding to cache 114, L1 caches 214A-B, L2 caches 216A-B, L2 cache 217, L3 cache 218, and/or other on-die storage), a tiered memory cache 530 (corresponding to tiered memory cache 130, tiered memory cache 230, and/or tiered memory cache 330), and a memory 520 (corresponding to memory 120, memory 220, and/or memory 320).

In FIG. 5A, when processor 510 and/or a core/chiplet thereof processes a memory request for tiered memory cache 530 (e.g., after exhibiting cache misses for lower-level caches), processor 510 and/or a controller thereof first locates a partial tag corresponding to the memory request at 552. As described herein, in some examples, processor 510 requests the partial tag for the page relating to the line requested in the original memory request.

When the requested page's partial tag is available in processor storage 514, a partial tag hit is exhibited at 554. However, the partial tag hit indicates that the requested page is potentially available in tiered memory cache 530. In some examples, the partial tag further indicates which way (e.g., one of ways 332A-D in FIG. 3) such that the partial tag hit indicates that the requested page is potentially in the indicated way. Therefore, in response to a partial tag hit, a full tag is located from the indicated way at 554. Because the partial tag indicates the potential way having the requested page/line, a full tag lookup on every way can be avoided. In some implementations, locating the full tag includes fetching the line requested in the memory request from the indicated way. In such implementations, the full tag is stored with the data line (e.g., as ECC bits).

When the requested line based on the full tag lookup is available in tiered memory cache 530 (e.g., in the indicated way), a full tag hit is exhibited at 556. The requested line is fetched from tiered memory cache 530 and returned to processor 510 for a read request. Alternatively, for a write request, the requested line is updated in tiered memory cache 530 and acknowledged at 556. In some implementations, the line and tag are fetched from tiered memory cache 530 in a single fetch operation, such as for the full tag lookup. For example, a line indicated by the partial tag (e.g., the indicated way) and the memory request (e.g., the address for the line) is first fetched, and the line's tag (which may be stored in the ECC bits) is checked for a full tag hit. If the fetched line was the requested line (e.g., full tag hit), the fetched line is returned to complete the memory request. If the fetched line was not the requested line (e.g., full tag miss), the requested line is fetched from memory 520, as described herein.

As described herein, using a partial tag lookup, which also indicates a potential way for a full tag lookup, reduces a number of full tag lookups (e.g., one for each way in tiered memory cache 530). In addition, to reduce metadata storage requirements for the tags and to avoid requiring an additional data structure for storing full tags, in some examples, the full tags are stored with other repurposed bits. For example, the full tags can be stored using one or more error correction code (ECC) bits.

In FIG. 5B, in contrast to a full tag hit at 554 as in FIG. 5A, tiered memory cache 530 exhibits a full tag miss at 554. For example, the full tag is not found in the indicated way, corresponding to a cache miss. The memory request proceeds to memory 520 at 558. Memory 520 returns the requested line at 560, which can also be written to tiered memory cache 530 at 559 to update tiered memory cache 530 in response to the cache miss. Alternatively, for a write request, the requested line is updated in memory 520 at 558, which can be propagated to tiered memory cache 530 at 559 (e.g., by updating tiered memory cache 530) and acknowledged at 560. In addition, the corresponding partial and full tags can be written to the appropriate storages.

Figure 6:
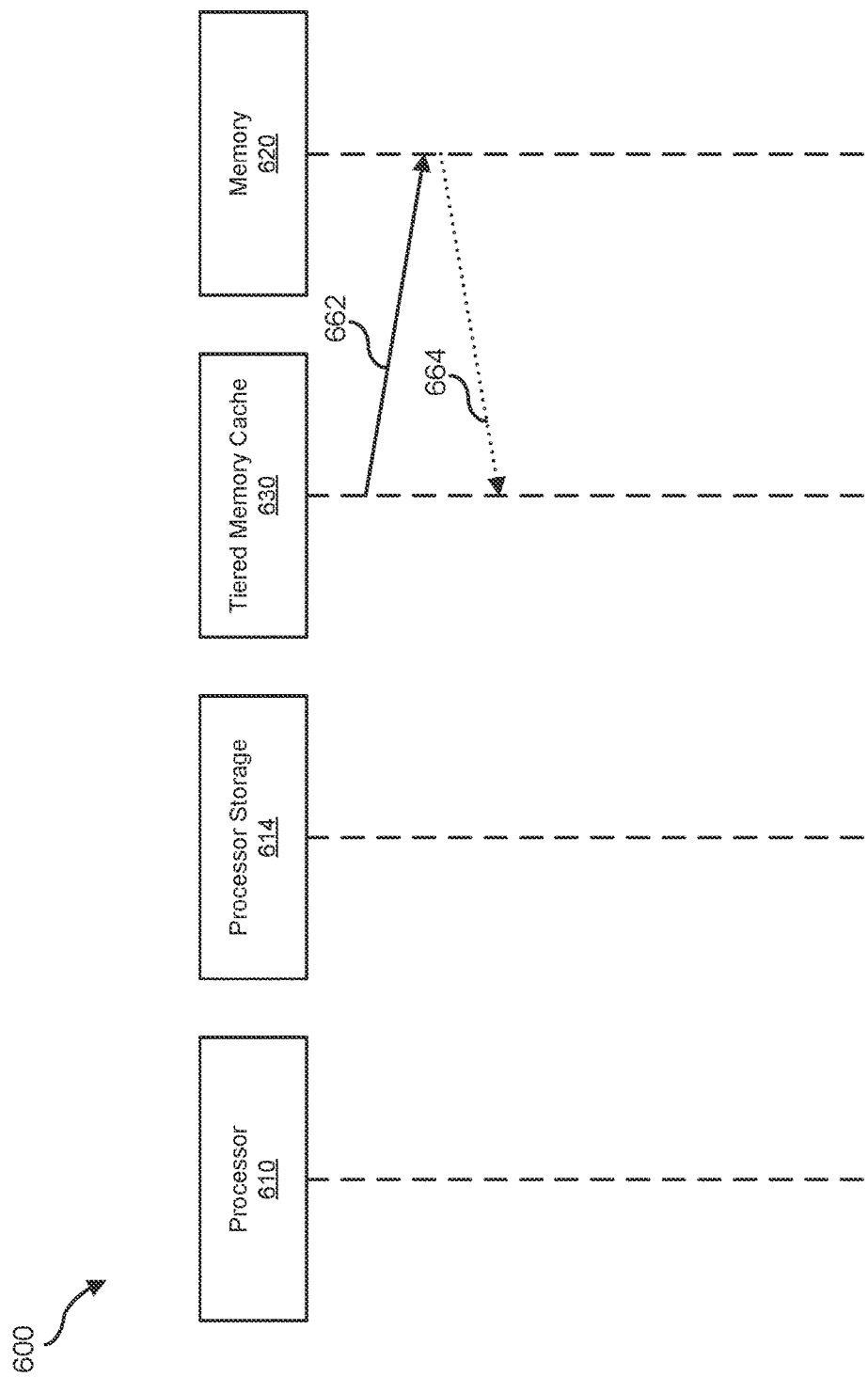
FIG. 6 is a flow diagram of updating a dirty page for a tiered memory cache.

FIG. 6 illustrates an example flow 600 for a dirty page. FIG. 6 illustrates a processor 610 (corresponding to processor 110, processor 210, and/or accelerator 211), a processor storage 614 (corresponding to cache 114, L1 caches 214A-B, L2 caches 216A-B, L2 cache 217, L3 cache 218, and/or other on-die storage), a tiered memory cache 630 (corresponding to tiered memory cache 130, tiered memory cache 230, and/or tiered memory cache 330), and a memory 620 (corresponding to memory 120, memory 220, and/or memory 320).

In FIG. 6, a dirty page in tiered memory cache 630 is written to memory 620 at 662. The dirty page can be selected, for instance, in response to a partial tag hit for the page (e.g., if the memory request is a write request). The page can be dirty (e.g., modified) in response to a prior or current write request.

In other examples, the dirty page is written in response to a partial tag miss for another page (e.g., as part of a page eviction process in which a page is removed from tiered memory cache 630 to provide space for the missed page). In some examples, memory 620 can acknowledge the write at 664 such that tiered memory cache 630 can safely evict the dirty page.

Figure 7:
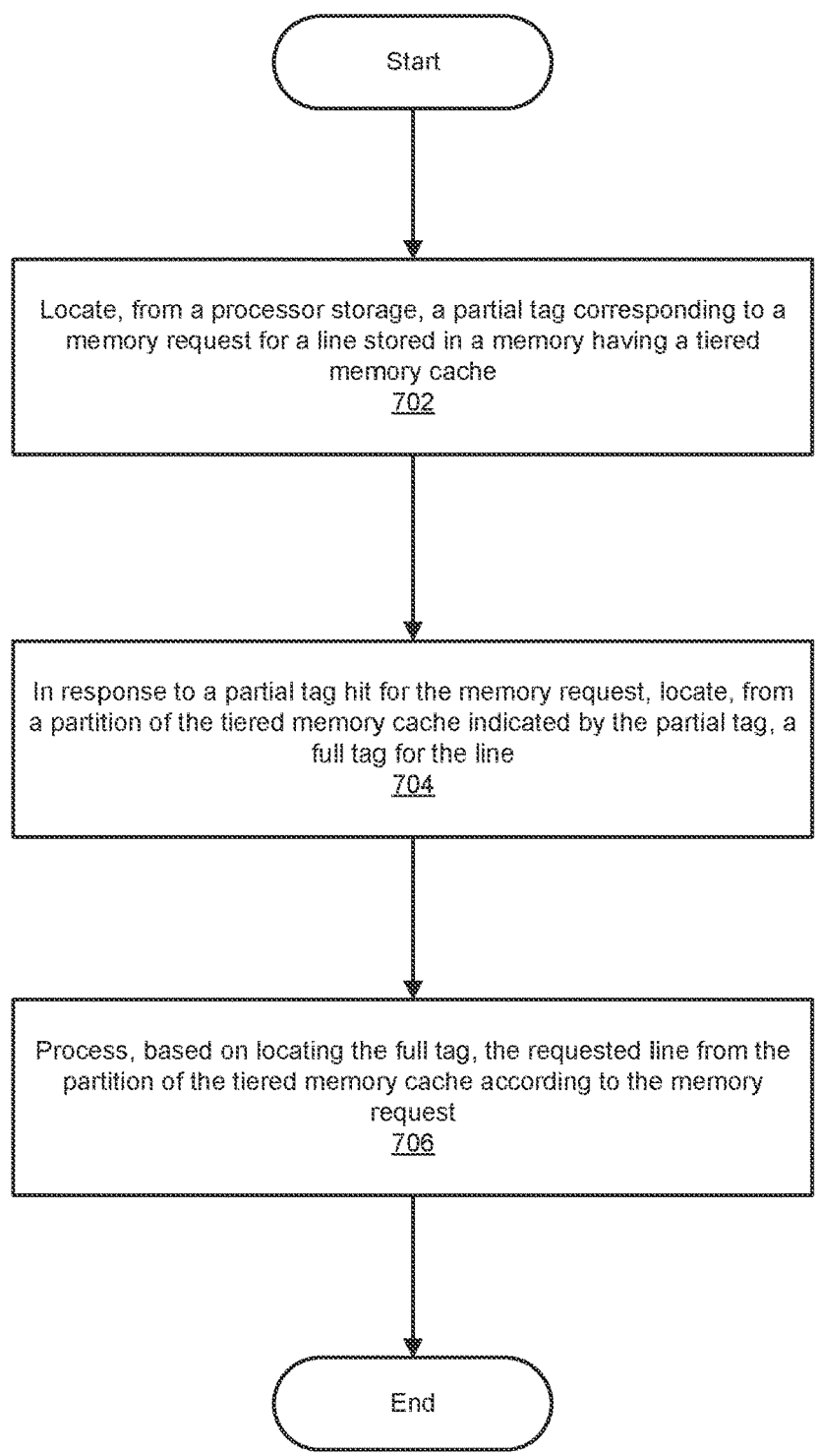
FIG. 7 is a flow diagram of an exemplary method for implementing a tiered memory cache.

FIG. 7 is a flow diagram of an exemplary computer-implemented method 700 for implementing a tiered memory cache. The steps shown in FIG. 7 can be performed by any suitable computer-executable code and/or computing system, including the system(s) illustrated in FIGS. 1, 2, and/or 3. In one example, each of the steps shown in FIG. 7 represent an algorithm whose structure includes and/or is represented by multiple sub-steps, examples of which will be provided in greater detail below.

As illustrated in FIG. 7, at step 702 one or more of the systems described herein locates, from a processor storage, a partial tag corresponding to a memory request for a line stored in a memory having a tiered memory cache. For example, processor 110 locates, from a processor storage (e.g., cache 114 and/or another on-die storage), a partial tag corresponding to a memory request for a line stored in tiered memory cache 130.

The systems described herein can perform step 702 in a variety of ways. In one example, tiered memory cache 130 is a set associative cache for memory 120. In some examples, the partial tag corresponds to a page such that the partial tag comprises a subset of the corresponding full tag.

In some examples, processor 110 fails to locate the partial tag, indicating a partial tag miss. In response to a partial tag miss, processor 110 fetches the requested line from memory 120. Further, in some examples, in response to the partial tag miss, a controller of tiered memory cache 130 (e.g., controller 142) evicts a page from the tiered memory cache and replaces, in the processor storage, a partial tag corresponding to the evicted page with a partial tag corresponding to the missed partial tag. In some examples, the controller writes the evicted page to the memory when the evicted page is dirty.

At step 704 one or more of the systems described herein locates, in response to a partial tag hit for the memory request, from a partition of the tiered memory cache indicated by the partial tag, a full tag for the line. For example, a controller of tiered memory cache 130 (e.g., controller 142) locates a full tag for the line indicated by the memory request. In some implementations, the full tag is stored using one or more error correction code (ECC) bits in tiered memory cache 130. For example, the full tag is stored in the ECC bits of the corresponding line itself along with the data. In such implementations, locating the full tag includes fetching the line requested by the memory request from the partition of the tiered memory cache (e.g., the indicated way).

In some examples, tiered memory cache 130 fails to locate the full tag, indicating a full tag miss. In response to the full tag miss, the controller fetches the requested line from memory 120.

At step 706 one or more of the systems described herein processes, based on locating the full tag, the requested line from the partition of the tiered memory cache according to the memory request. For example, tiered memory cache 130 fetches and returns the requested line to processor 110 for a read request. In some examples, the requested line was previously fetched in response to the partial tag hit for the full tag lookup. The previously fetched line can be returned for a read request or updated and written back to the partition of tiered memory cache 130 for a write request.

As described herein, the present disclosure is directed to improving a tiered memory cache. Implementing a set associative cache, which divides the tiered memory cache into a set of multiple ways, provides for a scalable tiered memory cache. In addition, the systems and methods provided herein can reduce overhead for accessing the tiered memory cache. In particular, the systems and methods provided herein reduce a number of lookups for finding a line in the tiered memory cache by using partial page tags and full tags.

The partial page tags are stored on die (e.g., in a processor storage) for fast lookups. The partial page tags have reduced metadata storage requirements than full tags such that the partial page tags can be stored on die. The partial page tags indicate which pages are located in which ways such that a partial page tag miss indicates that the requested line is not in the tiered memory cache. Thus, a partial page miss avoids a more expensive tag lookup process in the tiered memory cache.

A partial page hit indicates that the requested line might be in the tiered memory cache. To avoid having to perform expensive full tag lookups for each of the ways, the partial page tag also points to a specific way such that only a single full tag lookup is needed. Upon a full tag hit, the tiered memory cache returns the requested line or performs the requested write on the line. Upon a fill tag miss, the memory is accessed, and the tiered memory cache (and partial page tag and full tag) are accordingly updated. Thus, the systems and methods herein can reduce overhead by reducing accesses to the tiered memory cache and the memory.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a physical memory comprising at least two partitions, wherein a first partition of the at least two partitions acts as a cache for a second partition of the at least two partitions; and
   a controller configured to:
   locate, from a processor storage, a partial tag corresponding to a memory request for a line stored in the second partition;
   in response to a partial tag hit for the memory request, locate, from the first partition, a full tag for the line; and
   process, based on locating the full tag, the requested line from the first partition according to the memory request.

2. The device of claim 1, wherein the controller is further configured to, in response to a full tag miss, fetch the requested line from the second partition.

3. The device of claim 1, wherein the controller is further configured to, in response to a partial tag miss, fetch the requested line from the second partition.

4. The device of claim 3, wherein the controller is further configured to:
   evict a page from the first partition; and
   replace, in the processor storage, a partial tag corresponding to the evicted page with a partial tag corresponding to the missed partial tag.

5. The device of claim 4, wherein the controller is further configured to write the evicted page to the second partition when the evicted page is dirty.

6. The device of claim 1, wherein the full tag is stored using one or more error correction code (ECC) bits in the first partition.

7. The device of claim 1, wherein the partial tag corresponds to a page.

8. The device of claim 1, wherein the partial tag comprises a subset of the corresponding full tag.

9. The device of claim 1, wherein the first partition comprises a set associative cache for the second partition.

10. A system comprising:
    a physical memory comprising at least two partitions, wherein a first partition of the at least two partitions acts as a cache for a second partition of the at least two partitions;
    at least one physical processor comprising a processor storage; and
    a controller configured to:
    locate, from the processor storage, a partial tag corresponding to a memory request for a line stored in the second partition;
    in response to a partial tag hit for the memory request, locate, from the first partition, a full tag for the line;
    in response to a full tag miss, fetch the requested line from the second partition; and
    process the requested line according to the memory request.

11. The system of claim 10, wherein the controller is further configured to:
    in response to a partial tag miss, fetch the requested line from the second partition;
    evict a page from the first partition; and
    replace, in the processor storage, a partial tag corresponding to the evicted page with a partial tag corresponding to the missed partial tag.

12. The system of claim 11, wherein the controller is further configured to write the evicted page to the second partition when the evicted page is dirty.

13. The system of claim 10, wherein the full tag is stored using one or more error correction code (ECC) bits in the first partition.

14. The system of claim 10, wherein the partial tag corresponds to a page and the partial tag comprises a subset of the corresponding full tag.

15. The system of claim 10, wherein the first partition comprises a set associative cache for the second partition.

16. A method comprising:
    locating, from a processor storage of at least one physical processor, a partial tag corresponding to a memory request for a line stored in a physical memory;
    in response to a partial tag miss, fetching the requested line from the physical memory;
    evicting a page from a tiered memory cache comprising a set associative cache for the physical memory; and
    replacing, in the processor storage, a partial tag corresponding to the evicted page with a partial tag corresponding to the missed partial tag.

17. The method of claim 16, further comprising writing the evicted page to the memory when the evicted page is dirty.

18. The method of claim 16, further comprising:
    in response to a partial tag hit for the memory request, locating, from a partition of the tiered memory cache indicated by the partial tag, a full tag for the line;
    in response to a full tag miss, fetching the requested line from the physical memory; and
    processing, based on locating the full tag in the partition of the tiered memory cache, the requested line from the partition of the tiered memory cache according to the memory request.

19. The method of claim 18, wherein the full tag is stored using one or more error correction code (ECC) bits in the tiered memory cache.

20. The method of claim 18, wherein the partial tag corresponds to a page and the partial tag comprises a subset of the corresponding full tag.

* * * * *